US012436939B2

(12) United States Patent
Srivastava et al.

(10) Patent No.: US 12,436,939 B2
(45) Date of Patent: Oct. 7, 2025

(54) DATA REUSE FRAMEWORK

(71) Applicant: SAP SE, Walldorf (DE)

(72) Inventors: Garima Srivastava, Bangalore (IN); Yeshwant More, Bangalore (IN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 17/506,387

(22) Filed: Oct. 20, 2021

(65) Prior Publication Data

US 2023/0124170 A1 Apr. 20, 2023

(51) Int. Cl.
*G06F 16/23* (2019.01)
*G06F 16/215* (2019.01)
*G06F 16/22* (2019.01)
*G06F 16/245* (2019.01)
*G06F 16/248* (2019.01)

(52) U.S. Cl.
CPC ...... *G06F 16/2365* (2019.01); *G06F 16/2282* (2019.01); *G06F 16/2379* (2019.01); *G06F 16/245* (2019.01); *G06F 16/248* (2019.01)

(58) Field of Classification Search
None
See application file for complete search history.

(56) References Cited

U.S. PATENT DOCUMENTS

| 10,133,650 | B1* | 11/2018 | Park | G06F 11/3684 |
| 10,963,435 | B1* | 3/2021 | McAlister | G06F 11/0766 |
| 12,003,543 | B1* | 6/2024 | Ali | H04L 63/123 |
| 2007/0174076 | A1* | 7/2007 | Kord | G06Q 30/06 705/316 |
| 2022/0318522 | A1* | 10/2022 | Wolf | G06N 3/044 |
| 2022/0335110 | A1* | 10/2022 | Isaacs | G06F 21/31 |

OTHER PUBLICATIONS

Anvar Kabulov; On functions correcting the sets of incorrect algorithms; IEEE; 2020; pp. 1-5.*

* cited by examiner

*Primary Examiner* — Albert M Phillips, III
*Assistant Examiner* — Jermaine A Mincey
(74) *Attorney, Agent, or Firm* — Klarquist Sparkman, LLP

(57) ABSTRACT

Systems and processes for validating data for reuse in a system are provided herein. An object type relating to a scenario of operations performed by a system of an organization may be identified. Database tables and characteristics related to an object corresponding to the object type, as well as an application programming interface (API) related to the object may be identified. Data in the database tables may be validated for reuse in the system using the API, and an indication of results of validating the data may be output to a user interface.

19 Claims, 9 Drawing Sheets

START     500

↓

READ ACTIVE SCOPE ITEMS IN THE SYSTEM 502

↓

MAP OBJECT TYPES TO A TARGETED SCENARIO RELATING TO THE SCOPE ITEMS 504

↓

IDENTIFY RELATIONSHIPS BETWEEN OBJECT TYPES, DATABASE TABLES, AND CHARACTERISTICS FOR EACH OBJECT OF THE TARGETED SCENARIO 506

↓

FOR EACH OBJECT OF THE TARGETED SCENARIO, VALIDATE THE DATA IN THE DATABASE TABLES USING ASSOCIATED APIS 508

↓

PERFORM CORRECTIVE ACTION(S) BASED ON RESULTS OF VALIDATION 510

↓

OUTPUT RESULT OF VALIDATION 512

FIG. 6

| SCOPE ITEM | OBJECT TYPE | BUSINESS PROCESS | DATA RECORD IDENTIFIER | ACTION PERFORMED | API USED | API METHOD | RESPONSE | REMARKS |
|---|---|---|---|---|---|---|---|---|
| 18J | PURCHASE REQUISTION | PROCURE TO PAY | X0000353 | DATA VALIDATED | PURCHASEREQUESTION REQUEST_IN | GET | 0 | PURCHASE REQUISITION X0000353 CAN BE USED TO TEST SCENARIO 18J |
| 18J | PURCHASE REQUISTION | PROCURE TO PAY | X0000992 | DATA UPDATED | PURCHASEREQUESTION REQUEST_IN | PATCH | 200 | |
| 18J | PURCHASE REQUISTION | PROCURE TO PAY | X0000995 | DATA CREATED | PURCHASEREQUESTION REQUEST_IN | POST | 400 | |

| SCOPE ITEM | SCOPE ITEM DESCRIPTION | BUSINESS PROCESS | DIRECT LINK TO SCOPE ITEM | OBJECT TYPE | DATA RECORD IDENTIFIER | VALIDATION RESULT | FURTHER ACTION HELP |
|---|---|---|---|---|---|---|---|
| J62 | ASSET ACCOUNTING | ORDER TO CASH | https://examplelink1 | ASSET MASTER | | ✓ 100 | NOTE XXXX |
| | | | | PR | | ⊖ 50 | HELP LINK |
| | | | | PO | | ✗ 0 | |
| 2XT | CENTRAL PROCUREMENT | PROCURE TO PAY | https://examplelink2 | PR | | ⊖ 56 | |
| | | | | PO | | ✗ 25 | |
| 41G | CENTRAL INVOICING | LEAD TO CASH | https://examplelink3 | BILLING | | ⊖ 56 | |
| | | | | INVOICE | | ✓ 100 | |
| 40G | FIELD LOGISTICS PLANNING AND EXECUTION | MAKE TO ORDER | https://examplelink4 | ORDER | | ✓ 75 | |
| | | | | MATERIAL | | | |

DATA REUSE FRAMEWORK

BACKGROUND

Organizations often utilize various software solutions to manage their operations. Each software solution may undergo a different and varied kind of usage (e.g., in terms of standard, enhanced, or custom modifications) to support individual operational considerations. There is huge amount of data that is accumulated in each system as a result of functional operational processes being executed by the organizations. Although data may persist in various forms in different software solutions, there is currently no way to classify the data with respect to an operational (e.g., business) process, as this relation does not implicitly exist when the data is created for current applications. Accordingly, there remains a need for improved technologies to manage data processing and visualization in such applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and generating display information relating to data input into cartesian columns. In some examples, the disclosed technologies can be implemented as a method performed by a computer. An object type relating to a scenario of operations performed by a system of an organization may be identified. Database tables and characteristics related to an object corresponding to the object type, as well as an application programming interface (API) related to the object may be identified. Data in the database tables may be validated for reuse in the system using the API, and an indication of results of validating the data may be output to a graphical user interface.

In some examples, the disclosed technologies can be implemented as computer-readable media storing instructions which, when executed by one or more hardware processors, cause the hardware processors to perform the following actions. An object type relating to a scenario of operations performed by a system of an organization may be identified. Database tables and characteristics related to an object corresponding to the object type may be identified, and an application programming interface (API) related to the object may be identified. Data in the database tables may be validated for reuse in the system using the API, and a report of results of validating the data may be generated, for display via a graphical user interface, the report including an indication of whether the data is valid, invalid, or out-of-date.

In some examples, the disclosed technologies can be implemented in a system including one or more hardware processors with coupled memory, and computer-readable media storing instructions executable by the one or more hardware processors. The instructions include first, second, third, fourth, fifth, and sixth instructions. The first instructions, when executed, cause input indicating a scope of a data validation request to be received via a user interface displayed on a client computing device. The second instructions, when executed, cause database tables and characteristics relating to an object corresponding to an object type mapped to the scope of the data validation request to be identified. The third instructions, when executed, cause an application programming interface (API) relating to the object to be identified. Fourth instructions, when executed, cause data in the database tables to be validated for reuse in the system using the API. Fifth instructions, when executed, cause a report of results of validating the data to be generated, for display via the user interface, the report indicating a validity of the data for reuse in the system.

The foregoing and other objects, features, and advantages of the invention will become more apparent from the following detailed description, which proceeds with reference to the accompanying figures.

BRIEF DESCRIPTION OF THE DRAWINGS

FIGS. 6 and 7 are example outputs based on data validation performed by a reuse framework engine.

DETAILED DESCRIPTION

Introduction and Overview

Figure 1:
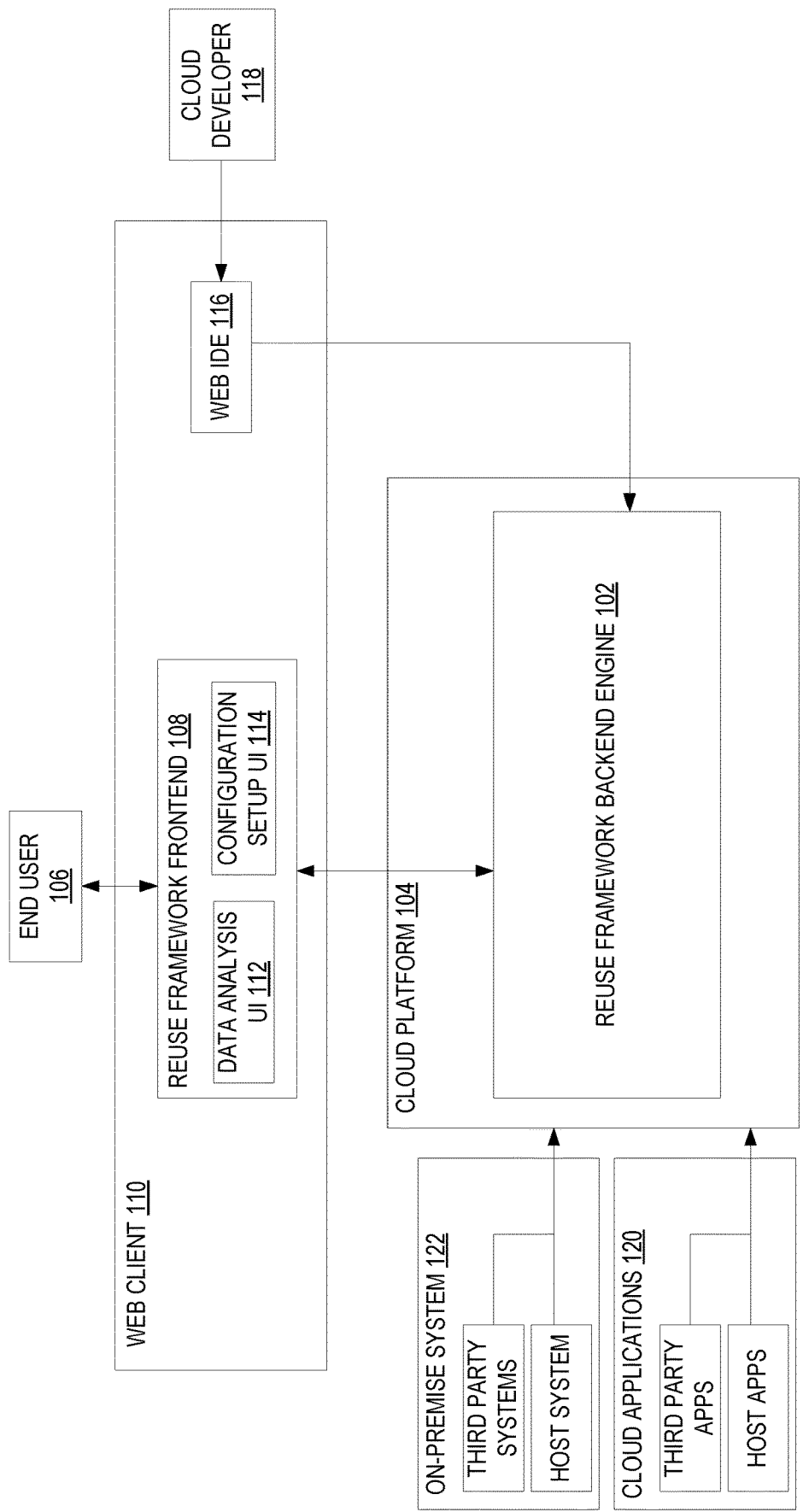
FIG. 1 is a block diagram of an example operating environment for a reuse framework engine.

Persistence and reuse of data sets created as a result of functional operational (e.g., business) processes is advantageous for many different aspects of software usage. For example, whenever there is a transition to a new version of software used by an organization, the ability to reuse existing data sets in the target system after the transition saves time and resources (e.g., by removing the need to re-establish those data sets). As another example, different kinds of tests (e.g., including automated and manual tests) may be performed on an organization's systems to ensure operational continuity for the organization. Running these tests by reusing existing data allows organizations to avoid unforeseen outages and downtimes. In a similar example, reuse of existing data can be helpful to test continuously-built features in a targeted system, as any newly added features are expected to run with existing business data. This helps make sure all developments of features work in a backward compatible manner. It is to be understood that the above scenarios are non-limiting examples in which the technologies described herein may be applied, and the technologies may be implemented in other applications and scenarios without departing from the scope of this disclosure.

Current approaches to data management typically revolve around a business object or data model, rather than organization/business processes. However, these approaches may cause business data to become unusable due to reasons such as software patches and/or upgrades, system/software enhancements and/or extensions, data model and design changes, and/or other conditions. Reliability and resource conservation are improved when the data set intended to be reused is cleansed/validated according to the identified business process rather than fetching it based on predetermined logic. In current systems, there is no functionality that can segregate and fix existing data sets as per business processes in a system. In order to address these existing issues, the disclosure provides an intelligent framework that can identify, map, process and correct data to be reused in business process checks in a system.

An example scenario for applying the disclosed technologies is described below with respect to a customer having a Procure to Pay process. In this scenario, the business objects involved may include, but are not limited to: Product, Purchase Requisitions, Purchase Orders, Goods Receipt Material Document, Invoice, and/or Billing. The operations involved in a procure to pay business process may include, but are not limited to: identifying the request or requisite of a product (e.g., based on the demand at a particular plant, determine that a certain quantity of product is to be acquired to execute the business operation, such as production, maintenance, etc.), creating requisitions (e.g., a Purchase Requisition is created to fulfill the demand), creating orders (e.g., a Purchase Order is created from approved Purchase Requisitions), receiving orders (e.g., products are received with respect to the Purchase Orders, and a Goods Receipt Material document is generally generated), invoice approval (e.g., Payment Invoices are sent to the vendor for approval), and/or vendor payment (e.g., financial settlement to the vendor is made).

It can be noted in the above business process, the data created in a customer system may be spread across Business Objects. However, the data of the products undergoing the Procure to Pay process may be linked across the scenario from Requisitions to Payment. In some systems, migration capabilities revolve around Business Objects and any standalone business object migrated using Migration Objects would not make sense in totality for the Procure to Pay process. For example, in Transition Scenario, if Purchase Orders data is migrated without Product Data in a customer system, the data would not be able to show the specifications of a product for which this order was processed in the target system. The framework described herein can, among other features, identify data that can be reused, map the data to the entire business process, propose fixes/corrections to the dataset when applicable, and prompt the same (e.g., allowing users to choose, cleanse, and pick data to be reused/migrated for any other objective), which addresses the above-described issues with other data management systems.

Example Environment

The disclosed framework may be deployed into any suitable deployment model. In one example, the framework may be available via an on-premises or cloud-based enterprise resource planning (ERP) system, wherein the framework is accessible as an application on a user interface launchpad which accesses a framework backend in the ERP system. FIG. 1 shows an example block diagram 100 of a high-level architecture of a reuse framework as a software-as-a-service (SaaS) offering on a cloud platform, wherein the framework is integrated with cloud-based customer or partner applications and consumed on an on-premise stack. For example, an intelligent data reuse framework backend engine 102 is hosted on a cloud platform 104, which is accessible by end user 106 using a reuse framework front end 108 implemented by a web client 110. Additional details regarding the functionality of the framework backed engine 102 are described below with respect to FIG. 2.

The web client may enable the end user 106 to access the cloud platform 104 via the Internet and/or via another network connected to the cloud platform to interact with the framework backed engine 102. For example, the front end 108 of the web client may include a data analysis user interface 112 providing user interactive elements for performing data management and analysis and a configuration setup user interface 114 providing user interactive elements for defining configurations and other parameters for the data management and analysis. The web client may also include a web integrated development environment (IDE) 116 to allow a cloud developer 118 to utilize and/or update the reuse framework backend engine 102.

As described above, the reuse framework backend engine 102 may be deployed as a Software as a Service (SaaS) offering that may be integrated with cloud-based customer and/or partner applications 120 (e.g., including third-party applications and/or host applications relating to the cloud platform) and may be consumed by an on-premise system 122 (e.g., including third party systems and/or host systems). The framework backend engine 102 may thus be consumed by new migration applications without significant overhead from the infrastructure.

Example Framework Engine

Figure 2:
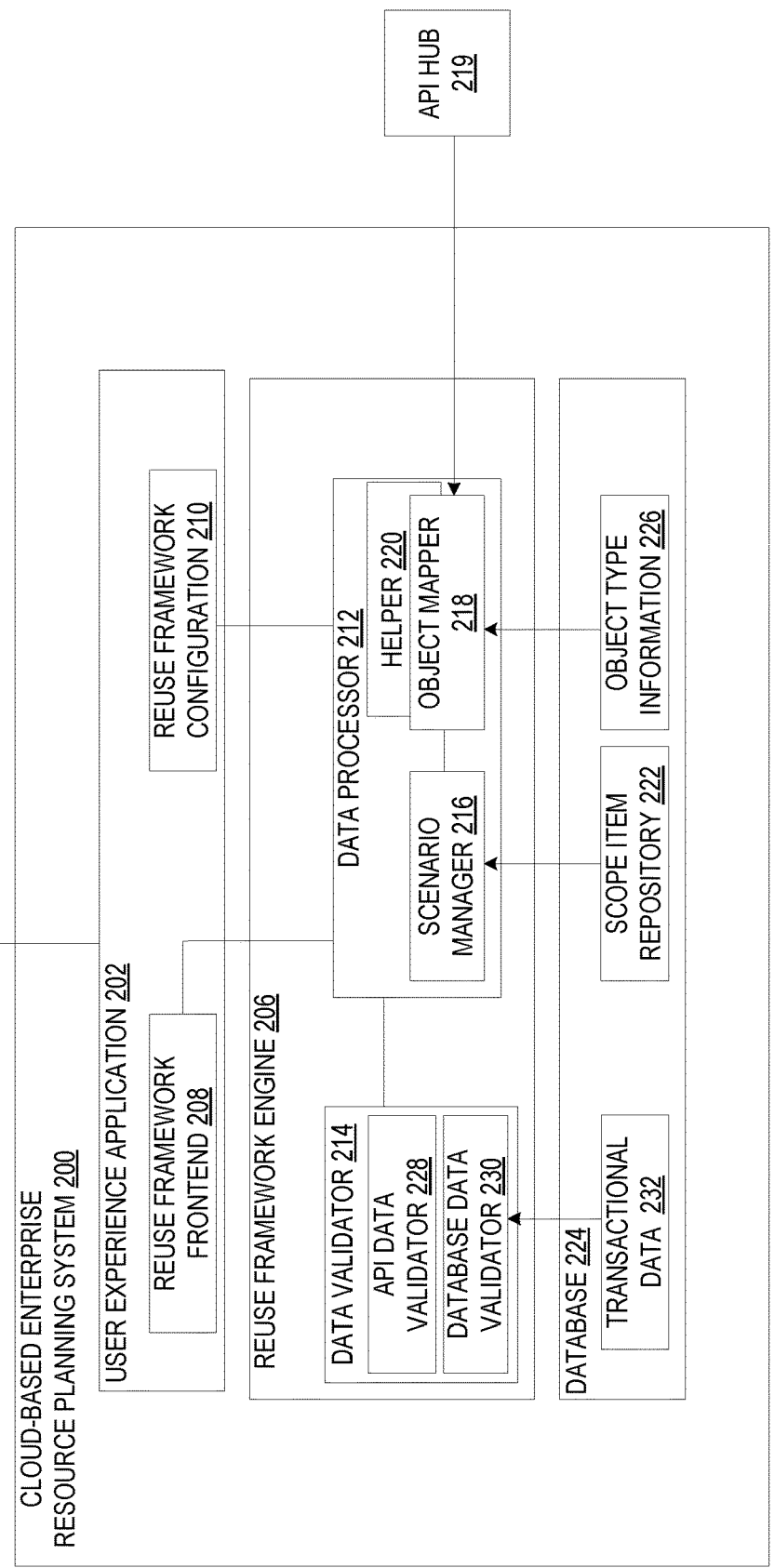
FIG. 2 is a block diagram of an example architecture for a reuse framework engine.

FIG. 2 shows additional details regarding an example architecture of a data reuse framework engine and associated components in a cloud-based ERP system 200. The system 200 executes a user interface application 202, which allows an enterprise data specialist 204 to interact with (e.g., adjust operating parameters and/or perform other actions described below) a data reuse framework engine 206 (e.g., an example of engine 102 of FIG. 1). The user experience application 202 includes a reuse framework front end 208, which may include an online application that displays information to the data specialist 206 and receives inputs to perform intermittent actions during the data analysis by the framework, examples of which described in more detail below. The user experience application 202 also includes a reuse framework configuration 210 (e.g., a set of configuration parameters stored and accessible by the application 202), which may provide, among other parameters, a timeframe of data to be considered by the framework to avoid overloading the application with a large amount of data. The configuration 210 may include configurations that are set to be able to read, process, and propose existing data to be reused for each scenario in the system 200. For example, the configuration 210 may indicate active scope items, a period up to which reusable data is to be considered, mappings of scenarios to object types (e.g., object-specific tables, respective application programming interfaces [APIs] for specific objects, characteristics, etc.), and/or other parameters associated with the operation of the engine 206.

The reuse framework engine 206 may include a data processor 212 and a data validator 214. The data processor 212 has an object type as the crux of its foci. For example, information from data being read from tables, APIs to consume, and active scenarios in the system are associated to a respective object type. An object type is associated with a set of characteristics. A technical object (e.g., a view or table) is associated with a respective object type such that a readable semantic identification can be used in processing relating to the technical object. As an illustrative, non-limiting example, an object "Production Order" can be uniquely identified by an associated identifier BUS2005. Attributes of the object "Production Order" may include a Controller, a Production Supervisor, an Order Type, a Plant, etc., and an identifier may be an Order Number. The "Production Order" object may be associated with a corresponding API reference (e.g., a Product Order API) that describes the actions that can be performed on this API. Objects may have several characteristics that may be used to determine the validity of the objects, and each object may have one or more APIs published in an API hub to perform corresponding actions (e.g., GET, POST, PATCH, etc.), responses to which may indicate whether a targeted function was executed successfully.

The reuse framework described herein also relates to an entity referred to as a Scenario. A Scenario is associated with one or more object types, which are read from a test script attached to a scope item. A non-limiting example of a scenario is "Make to Order" (e.g., for manufacturing production), where a production process is triggered based on an Order that is received. This example scenario begins from receiving a Sale Order, proceeds to Planning, and then executing the Production for a respective commodity using a Production Order. A relationship between Scenario, Object Type, Database Table, and Characteristics is established in the disclosed framework to help in reading, validating, and identifying the data that can be reused from the system.

Returning to the architecture of the reuse framework engine shown in FIG. 2, the data processor 212 includes a scenario manager 216 (e.g., a scenario checker) configured to read active scope items (e.g., defined by the configuration 210) in the system. For example, a scope item may be an activatable object, which activates a respective functionality in an application or ERP process. A collection of available scope items may be stored in a scope item repository. Accordingly, for example, the scenario manager 216 may retrieve the active scope item data from a scope item repository 222 in a database 224 for the ERP system 200. The data processor 212 also includes an object mapper 218 configured to prepare relevant object types based on the information received by the scenario manager as described above. The object mapper 218 is further configured to read information such as characteristics of the scenario objects, database tables that store scenario object data, an identification of an API relevant for the scenario objects (e.g., based on a query to an API hub 219), and/or other information. The above information and/or other information used by the object mapper 218 to perform the above operations may be stored in an object type information repository 226 in the database 224. The object mapper 218 may utilize a helper 220 to retrieve the information and/or perform the mapping in some examples. For example, the helper 220 may be a class or method in the framework used to assist a main object class/method in providing some functionality. Additional helper functionality is described below with respect to FIG. 5.

The data processor 212 may further be configured to call the data validator 214 by passing at least some of the information retrieved by the object mapper 218 (e.g., the database tables and the API). The data validator 214 may be configured to receive the information from the data processor 212 (e.g., the tables and API). A database data validator 228 is configured to read the tables to check data from the transactional data 232 that is persisting for a respective scenario object. An API data validator 230 is configured to execute the APIs identified by the object mapper 218 to check, cleanse, and/or create the persisting data and pass the response back to the data processor 212.

Figure 3:
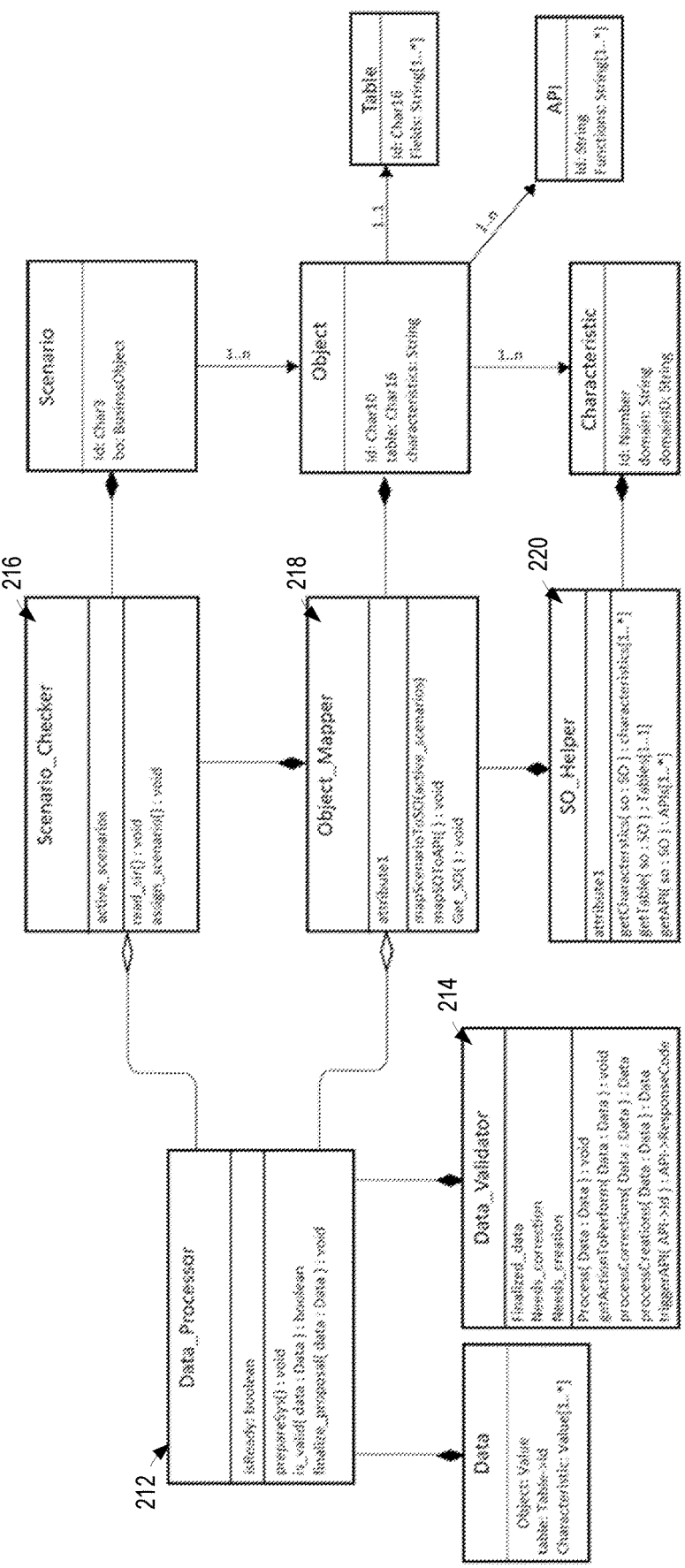
FIG. 3 is an example class diagram for a data processor of a reuse framework engine.
Figure 4:
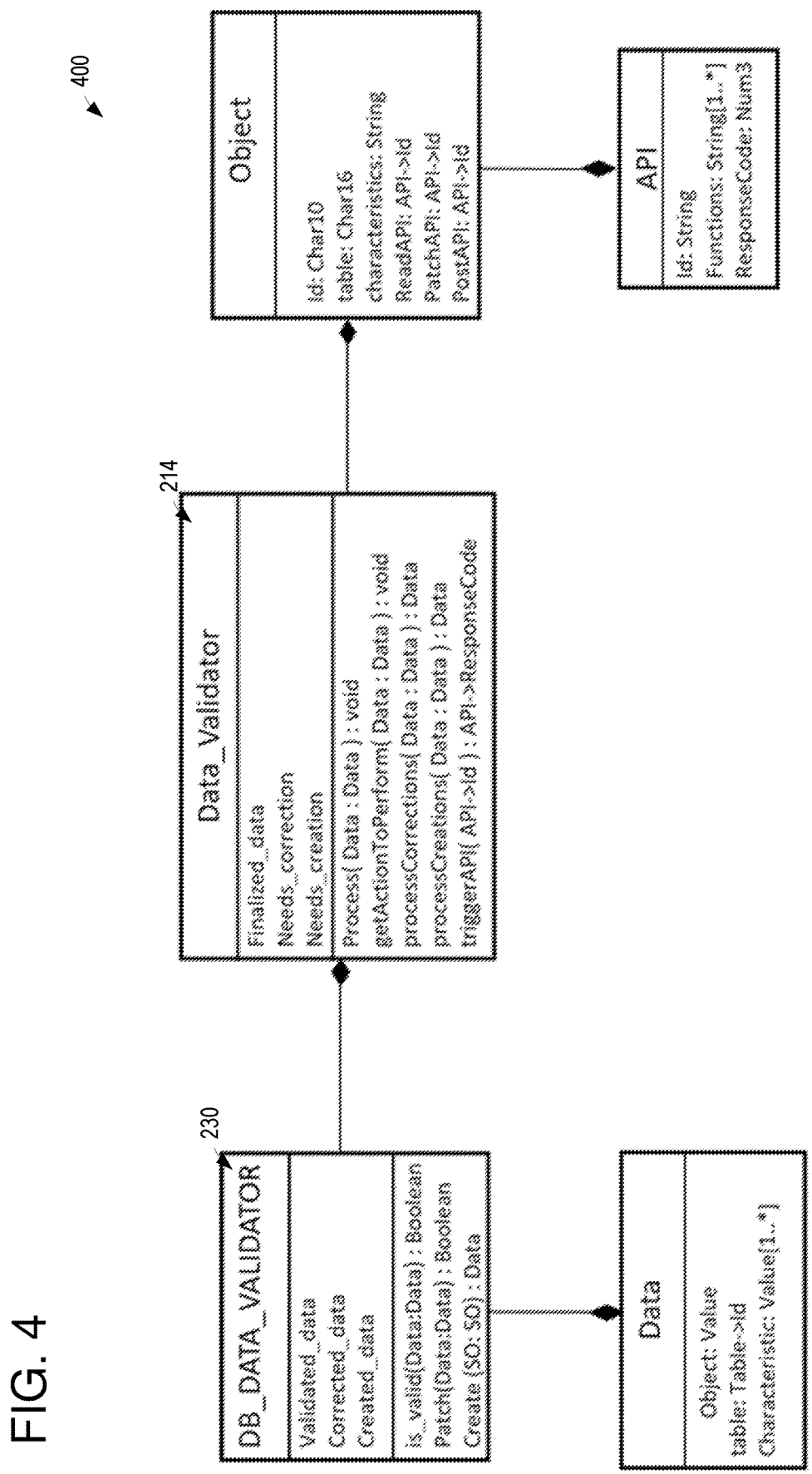
FIG. 4 is an example class diagram for a data validator of a reuse framework engine.

Example class diagrams of the data processor 212 and the data validator 214 are shown in FIGS. 3 and 4, respectively. For example, FIG. 3 shows a class diagram 300 of the data processor 212 including a domain model for reusage of data in a system, such as system 200 of FIG. 2. The class diagram 300 of FIG. 3 shows example rules, datatypes, and operational mappings for components of system 200 relating to data processor 212 of FIG. 2. FIG. 4 shows a class diagram 400 of the data validator 214, showing example rules, datatypes, and operational mappings for components of system 200 relating to data validator 214 of FIG. 2.

Example Method—Validating Data Using Framework

Figure 5:
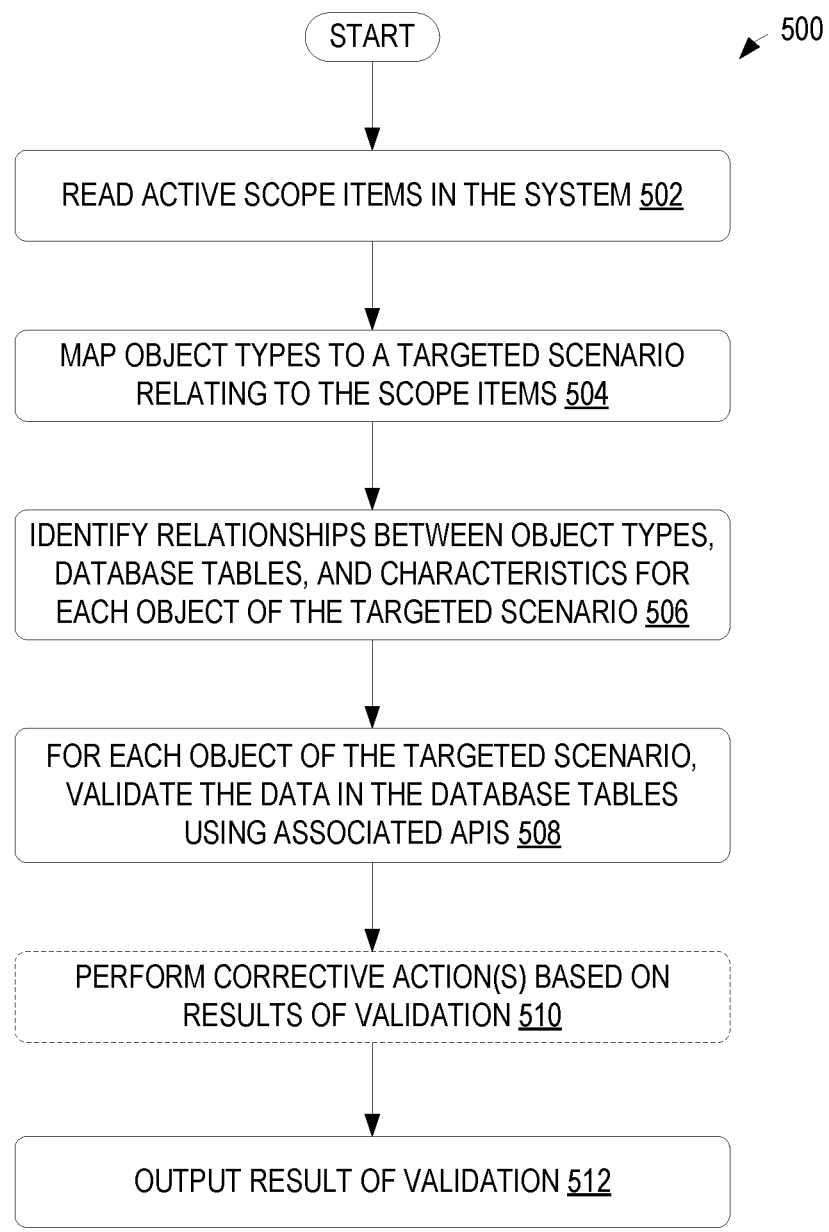
FIG. 5 is a flow chart of an example method for validating data for reuse in a system using a reuse framework engine.

FIG. 5 is a flowchart of an example method 500 for preparing and processing data to identify and validate data to be reused in an enterprise system. The method 500 may be performed by a reuse framework engine (e.g., as described above with respect to FIG. 2). At 502, the method includes reading active scope items in a targeted system, such as an enterprise resource planning (ERP) system. At 504, the method includes mapping object types to a targeted scenario relating to the scope items. At 506, the method includes identifying relationships between object types, database tables, and characteristics for each object of the targeted scenario. For example, an object mapper, such as object mapper 218 of FIG. 2, may read information including characteristics of a respective object, database tables that store object data for the respective object, and APIs relevant for the respective object, in order to map the relationships between this information for a given object. The object mapper may be a primary actor in the framework, and may function to derive relationship information between scope items and objects. The object mapper may use the information from the helper class and map it with relevant scope items. The helper class may get information of characteristics, such as table names, from which data record identifiers are determined.

At 508, the method includes, for each object of the targeted scenario, validating the data in the database tables using associated APIs. As described above, a data validator, such as data validator 214 of FIG. 2, may be used to validate the data in the database. In order to perform such validation, the data may be prepared by reading existing data in the system relevant to the active scope items up to an amount of time specified in the Data Analysis Configuration (e.g., configuration 210 of FIG. 2). Once the data set is prepared, the data set may be analyzed further to determine the correctness in terms of reusability according to the target and test scenario. In an example, a software program consumes relevant classes to prepare the data in the manner mentioned above on the system it is being executed. The prepared data (e.g., prepared as described above) is then processed by calling APIs to check the correctness of the data to be reused according to a respective scope item to which the data is mapped. APIs are read from an API hub that includes information of scope items and/or objects to which the API is relevant. The API functions and response codes are read and used to check the correctness of data.

Example API functions that may be read and used as described above include, but are not limited to GET, PATCH, and POST. The GET function is used to pass the value of the data to check the validity of the data. The response code received from this call indicates if the data is correct, out-of-date, or is incorrect (e.g., which would indicate that the data is to be created and/or corrected. The response code may be configured to be a selected string, number, and/or other indication of the status of the data. In examples where the response code is configured to be a number, the response code may be configured to be a first number (e.g., 0 in a non-limiting example) to indicate that the data is correct. The response code may be further configured to be a second number or a number within a range having a lower bound (e.g., equal to the first number) and an upper bound, such as a number between 0 and 400 in a non-limiting example, to indicate that the data is out-of-date. The response code may be further configured to be a third number or a number above a threshold (e.g., the upper bound of the range for the out-of-date response code, such as above 400 in a non-limiting example) to indicate that the data is incorrect. The GET function may occur in a method GetActionToPerform in a first thread in the sequence of operation.

The PATCH method is used to correct the data that has some missing information. This PATCH, if successful, is recursively passed to GET method until a RC=0 (or other indicator of correct data) is received. The PATCH method may occur in a method ProcessCorrections in a parallel thread to optimize execution time.

The POST method is used to create new valid data in the system that can be used for testing. When new data is created (e.g., via the POST method), the new data is a fresh instance of the corresponding data that is relevant for a specific business process. The POST method may occur in a method ProcessCreations in parallel thread to optimize execution time. In some examples, new valid data is created based on errors that can be automatically corrected by the framework. Accordingly, in cases where the errors leading to an RC that indicates incorrect data cannot be automatically corrected by the framework, a message may be output indicating this status (e.g., output via the dashboard as a note for further action help, such as in column 8 of FIG. 7, described in more detail below).

At 510, the method optionally includes performing one or more corrective actions on the data based on the results of the validation at 508. For example, for data found to be not valid (e.g., incorrect or updatable) in the system, a proposal is generated for creating a new set of data (e.g., for data deemed to be incorrect by the validation at 508) and/or to update the data (e.g., adding missing characteristics or additional information to make it valid, for data deemed to be out-of-date by the validation at 508).

At 512, the method includes outputting results of the validation at 508 and/or the corrections optionally performed at 510. For example, an indication of candidate data to be reused in an enterprise system and proposed fixes (when applicable) to enable the data to be reused in the enterprise system may be output via a user interface (e.g., a graphical user interface displayed on a client device of an end user, data specialist, and/or other user). Examples of output information are described in more detail below with respect to the example user interfaces shown in FIGS. 6 and 7.

Examples of User Interfaces

FIGS. 6 and 7 show examples of output that may be presented via a user interface in accordance with operation of a reuse framework engine (e.g., engine 206 of FIG. 2). For example, the output of FIGS. 6 and 7 may be presented via a reuse framework frontend, such as frontend 208 of FIG. 2 and/or frontend 108 of FIG. 1.

FIG. 6 shows an example portion of a user interface 600, which shows example output from a data validator. For example, the output shown in user interface 600 may reflect results of actions performed by the data validator 214 of FIG. 2. It is to be understood that results of the data validator described herein may be presented in alternative manners without departing from the scope of the disclosure, and additional, fewer, or different information relating to the results may be shown in a user interface in other examples. In the illustrated example of FIG. 6, user interface 600 shows a table identifying, for each entry of the table, an indication of the following information: scope item, object type, business process, data record identifier, action performed, API used, API method (e.g., operation), response (e.g., response code, used to identify whether the data is correct, out-of-date, or incorrect as described above), and additional remarks (where applicable). For example, as described above, a validation performed on a scope item may perform different API operations (e.g., GET, PATCH, POST, etc.), the results of each of which are presented in the table in the response column, and the action performed in response to the results (e.g., based on the respective response code) are indicated in the action performed column. The data record identifier column may include a respective identifier for data (e.g., an identifier of the corresponding data as stored in the transactional data 232 of FIG. 2) on which the validation is performed.

FIG. 7 shows an example portion of a user interface 700, which shows example output from a reuse framework engine (e.g., engine 206 of FIG. 2) based on a performance of data validation (e.g., method 500 of FIG. 5) on data in a system. It is to be understood that results of the data validator described herein may be presented in alternative manners without departing from the scope of the disclosure, and additional, fewer, or different information relating to the results may be shown in a user interface in other examples. In the illustrated example of FIG. 7, user interface 700 shows a table identifying, for each entry of the table, an indication of the following information: scope item, scope item description, business process, direct link to scope item, object type, data record identifier, validation result, and further action help. The scope item, item description, business process, and direct link fields may provide the referenced information relating to each scope item of the table. For each scope item, one or more object types may be validated, and the respective validation result may be presented in the table, with a further action note if applicable. For example, the notes may include helpful information to assist with corrective actions to make the data valid. As shown at 702, an icon may be used for quickly identifying a validation result (e.g., based on the validation performed as described above at 508 of FIG. 5). For example, an "x" (e.g., in a red circle) may indicate that the associated data is not valid and cannot be reused, an "!" (e.g., in a yellow circle) may indicate that the data is out-of-date and can be updated with more information, and a check mark (e.g., in a green circle) may indicate that the data is valid and reusable for an object.

A Generalized Computer Environment

Figure 8:
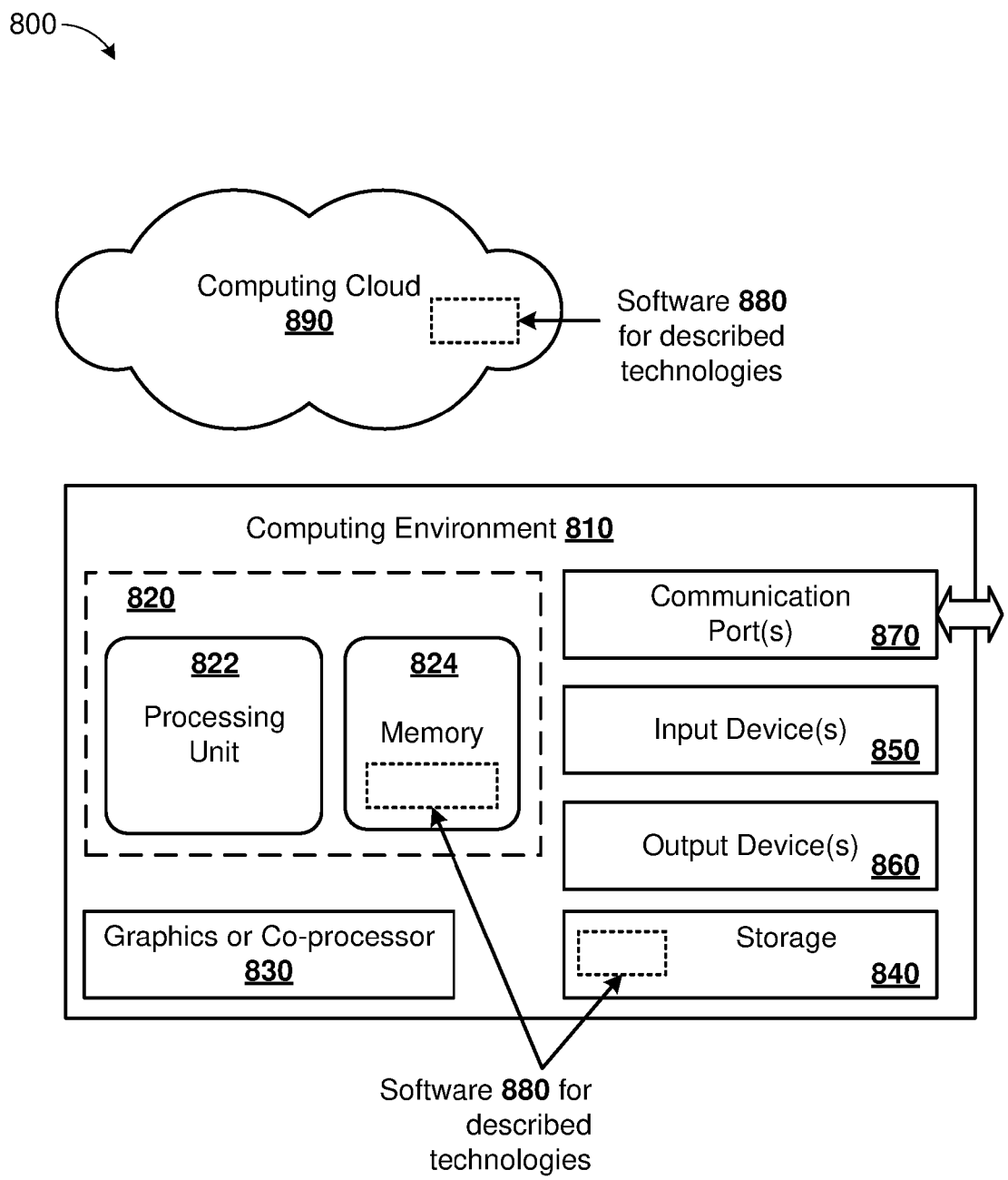
FIG. 8 is a diagram schematically depicting a computing environment suitable for implementation of disclosed technologies.

FIG. 8 illustrates a generalized example of a suitable computing system 800 in which described examples, techniques, and technologies, including construction, deployment, operation, query processing, and maintenance of a composite graph data structure or dynamic rooted trees according to disclosed technologies can be implemented. The computing system 800 is not intended to suggest any limitation as to scope of use or functionality of the present disclosure, as the innovations can be implemented in diverse general-purpose or special-purpose computing systems.

With reference to FIG. 8, computing environment 810 includes one or more processing units 822 and memory 824. In FIG. 8, this basic configuration 820 is included within a dashed line. Processing unit 822 executes computer-executable instructions, such as for implementing any of the methods or objects described herein for performing queries on a composite graph data structure representing a dynamic system, or various other architectures, components, handlers, managers, modules, or services described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein.

The input device(s) 850 can be a mechanical, touch-sensing, or proximity-sensing input device such as a keyboard, mouse, pen, touchscreen, trackball, a voice input device, a scanning device, or another device that provides input to the computing environment 810. The output device(s) 860 can be a display, printer, speaker, optical disk writer, or another device that provides output from the computing environment 810.

The communication port(s) 870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 9:
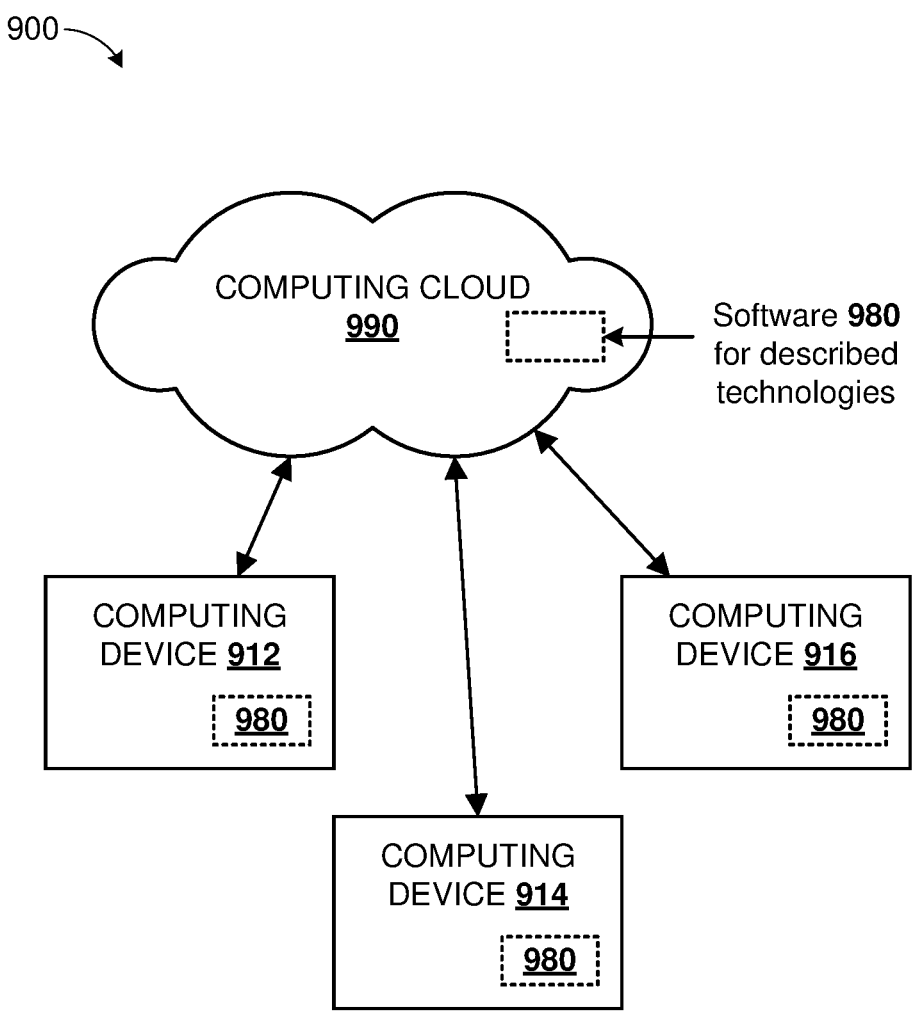
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., servers, virtual machines, embedded systems, desktop, or laptop computers), mobile devices (e.g., tablet computers, smartphones, or wearable appliances), or other types of computing devices. Communication links between computing cloud 990 and computing devices 912, 914, and 916 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 824, and storage 840. The term computer-readable storage media does not include signals and carrier waves. In addition, the term computer-readable storage media does not include communication ports (e.g., 870) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method comprising:
   identifying, for a targeted scenario of operations of a plurality of scenarios of operations performed by a system of an organization, a set of object types associated with the targeted scenario of operations, wherein the scenarios of operations are mapped to different object types;
   for one or more object types of the set of object types:
   identifying a scenario object associated with the object type;
   identifying database tables and characteristics related to the scenario object, wherein the database tables comprise preexisting data to be tested for reuse in the system;
   identifying an application programming interface (API) related to the scenario object, wherein the identifying the API is based, at least in part, on the targeted scenario of operations; and
   validating, according to the targeted scenario of operations, the preexisting data for reuse in the system, wherein the validating comprises calling the API to process the preexisting data and check a correctness of the preexisting data to be reused by passing a value of the preexisting data to the API and receiving a response code indicating the correctness of the preexisting data to be reused in the system;

for at least one of the object types of the set of object types, selectively performing a corrective action on the preexisting data based on results of the validation according to the targeted scenario of operations, the corrective action including one or both of (i) creating new data in the system or (ii) updating the preexisting data that was validated via the calling the API; and outputting, to a graphical user interface, an indication of results of validating the preexisting data according to the targeted scenario of operations.

2. The computer-implemented method of claim 1, wherein the response code indicates that the preexisting data is one of: invalid, out-of-date, or valid.

3. The computer-implemented method of claim 2, wherein the corrective action includes updating the preexisting data with additional information to correct the preexisting data responsive to receiving a response code that indicates that the preexisting data is out-of-date.

4. The computer-implemented method of claim 2, further comprising one or more of:
(i) determining that the response code indicates that the preexisting data is out-of-date when the response code is above a first threshold value and below a second threshold value;
(ii) determining that the response code indicates that the preexisting data is valid and reusable in the system when the response code is equal to the first threshold value; or
(iii) determining that the response code indicates that the preexisting data is invalid when the response code is equal to the second threshold value.

5. The computer-implemented method of claim 2, wherein outputting the indication of the results of validating the preexisting data includes outputting an indication of the response code to the graphical user interface in association with the object type.

6. The computer-implemented method of claim 2, wherein the corrective action includes creating new data in the system responsive to receiving a response code that indicates that the preexisting data is invalid.

7. The computer-implemented method of claim 1, further comprising determining a timeframe of data to be validated, and wherein validating the preexisting data comprises validating only preexisting data corresponding to the timeframe.

8. The computer-implemented method of claim 7, wherein the timeframe is received via user input to a configuration setup user interface of the system.

9. The computer-implemented method of claim 1, wherein the method is performed by a reuse framework engine executing on a cloud-based computing system.

10. The computer-implemented method of claim 9, wherein the reuse framework engine is integrated with on-premise and cloud-based applications.

11. One or more non-transitory computer-readable media storing instructions which, when executed by one or more hardware processors, cause the hardware processors to perform actions comprising:
identifying, for a targeted scenario of operations of a plurality of scenarios of operations performed by a system of an organization, a set of object types associated with the targeted scenario of operations, wherein the scenarios of operations are mapped to different object types;
for one or more object types of the set of object types:
identifying a scenario object associated with the object type;
identifying database tables and characteristics related to the scenario object, wherein the database tables comprise preexisting data to be tested for reuse in the system;
identifying an application programming interface (API) related to the scenario object, wherein the identifying the API is based, at least in part, on the targeted scenario of operations; and
validating the preexisting data for reuse in the targeted scenario of operations performed by the system by calling the API to check a correctness of the preexisting data according to the targeted scenario of operations, wherein validating the preexisting data by calling the API to check the correctness of the preexisting data according to the targeted scenario of operations includes passing a value of the preexisting data to the API and receiving a response code indicating the correctness of the preexisting data according to the targeted scenario of operations;
generating, for display via a graphical user interface, a report of results of validating the preexisting data for reuse in the targeted scenario of operations, the report including an indication of whether the preexisting data is valid, invalid, or out-of-date; and for at least one of the object types of the set of object types, selectively performing a corrective action on the preexisting data based on the results of the validation, the corrective action including one or both of (i) creating new data in the system or (ii) updating the preexisting data in the database tables that was validated by calling the API to process the preexisting data and check the correctness of the preexisting data according to the targeted scenario of operations.

12. The one or more non-transitory computer-readable media of claim 11, wherein passing the value of the preexisting data to the API comprises performing a GET action to pass the value of the preexisting data to check the correctness of the preexisting data to be reused, and wherein selectively performing the corrective action comprises calling the API to perform a POST or PATCH action to correct or generate new valid data.

13. The one or more non-transitory computer-readable media of claim 11, wherein updating the preexisting data includes updating the preexisting data with missing characteristics or additional information responsive to the API returning a result indicating that the data is out-of-date.

14. The one or more non-transitory computer-readable media of claim 11, wherein creating new data comprises creating new data to replace the preexisting data responsive to the API returning a result indicating that the data is invalid.

15. A system comprising:
one or more hardware processors with memory coupled thereto;
non-transitory computer-readable media storing instructions executable by the one or more hardware processors, the instructions comprising:
first instructions to receive, via a user interface displayed on a client computing device, input indicating a scope of a data validation request;
second instructions to identify, for a targeted scenario of operations of the data validation request, a set of object types associated with the targeted scenario of operations, wherein the targeted scenario of operations is one of a plurality of scenarios of operations performed by a system of an organization, and wherein the scenarios of operations are mapped to different object types;

third instructions to, for one or more object types of the set of object types:
identify a scenario object associated with the object type;
identify database tables and characteristics relating to the scenario object, wherein the database tables comprise preexisting data to be tested for reuse in the system;
identify an application programming interface (API) relating to the scenario object, wherein the identifying the API is based, at least in part, on the targeted scenario of operations; and
call the API to perform API functions to process the preexisting data and to validate, according to the targeted scenario of operations, the preexisting data for reusability in the system, wherein the API functions include a first function to pass a value of the preexisting data to check validity of the preexisting data for reuse according to the targeted scenario of operations, and one or both of (i) a second function to correct preexisting data in the database tables that has missing information or (ii) a third function to create new valid data for the system; and fourth instructions to generate, for display via the user interface, a report of results of validating the preexisting data according to the targeted scenario of operations, the report indicating a validity of the preexisting data for reuse in the system.

16. The system of claim 15, wherein the first function includes receiving a response code indicating the validity of the preexisting data to be reused in the system according to the targeted scenario of operations, and wherein the second function or the third function is performed based on the response code.

17. The system of claim 15, wherein the preexisting data is validated by a reuse framework engine hosted by a cloud-based enterprise resource planning system.

18. The computer-implemented method of claim 1, wherein the targeted scenario of operations is a first targeted scenario of operations, wherein the set of object types associated with the first targeted scenario of operations is a first set of object types, and wherein the method further comprises:

identifying, for a second targeted scenario of operations of the plurality of scenarios of operations performed by the system of an organization, a second set of object types associated with the second targeted scenario of operations, wherein the second set of object types is different than the first set of object types;

for one or more object types of the second set of object types:
identifying a scenario object associated with the object type;
identifying database tables and characteristics related to the scenario object, wherein the database tables comprise preexisting data to be tested for reuse in the system;
identifying an application programming interface (API) related to the scenario object, wherein the identifying the API is based, at least in part, on the second targeted scenario of operations; and
validating, according to the second targeted scenario of operations, the preexisting data for reuse in the system, wherein the validating comprises calling the API to process the preexisting data and check a correctness of the preexisting data to be reused by passing a value of the preexisting data to the API and receiving a response code indicating the correctness of the preexisting data to be reused in the system;
and for at least one of the object types of the second set of object types, selectively performing a corrective action on the preexisting data based on results of the validation according to the second targeted scenario of operations, the corrective action including one or both of (i) creating new data in the system or (ii) updating the preexisting data that was validated via the calling the API, and
wherein the outputting, to a graphical user interface, the indication of results of validating the preexisting data to the graphical user interface comprises outputting an indication of results of validating the preexisting data according to the second targeted scenario of operations.

19. The computer-implemented method of claim 1, further comprising mapping the object types of the set of object types to the targeted scenario of operations.

* * * * *